United States Patent Office 3,642,811
Patented Feb. 15, 1972

3,642,811
PROCESS FOR THE PREPARATION OF 3-AMINO-4-BROMO-1,2,5-THIADIAZOLE
Hans-Klaus Vorreither, Werner Obendorf, Kurt Menzl, and Harald Hofer, Linz (Danube), Austria, assignors to Osterreichische Stickstoffwerke Aktiengesellschaft, Linz (Danube), Austria
No Drawing. Filed Mar. 27, 1969, Ser. No. 811,235
Claims priority, application Austria, Apr. 3, 1968,
A 3,222/68
Int. Cl. C07d 91/68
U.S. Cl. 260—306.8 D                3 Claims

ABSTRACT OF THE DISCLOSURE 3-amino-4-bromo-1,2,5-thiadiazole is prepared by reacting an alkalimetal salt of 3-amino-1,2,5-thiadiazole-(4)-carboxylic acid in aqueous suspension with bromine at a temperature below 65° C.

---

This invention relates to a process for the preparation of 3-amino-4-bromo-1,2,5-thiadiazole.

3-amino-4-bromo-1,2,5-thiadiazole, which is a valuable intermediate compound for the manufacture of 1,2,5-thiadiazole derivatives, such as for example the 3-amino-4-alkoxy-thiadiazoles, or of various sulphonamides of the thiadiazole series, such as for example the 3-ethoxy-4-4′-sulphanilamido)-1,2,5-thiadiazoles described and claimed in U.S. patent specification 3,247,193, was hitherto obtained by bromination of 3-amino-1,2,5-thiadiazole in glacial acetic acid. The 3-amino-1,2,5-thiadiazole could be prepared by decarboxylation of 3-amino-1,2,5-thiadiazole-(4)-carboxylic acid, for example in trichlorobenzene as the solvent.

It has now surprisingly been found that 3-amino-4-bromo-1,2,5-thiadiazole can be very simply prepared directly from an alkali metal salt of 3-amino-1,2,5-thiadiazole-(4)-carboxylic acid if the salt is reacted in aqueous suspension with bromine at a temperature below 65° C. This manner of preparation is very surprising since it was to be expected that the 1,2,5-thiadiazole ring would thereby also simultaneously be degraded, this being a reaction which is in fact to be observed at temperatures above 65° C.

Accordingly the present invention provides a process for the preparation of 3-amino-4-bromo-1,2,5-thiadiazole which comprises reacting an alkali metal salt, for example the sodium or potassium salt, of 3-amino-1,2,5-thiadiazole-(4)-carboxylic acid in aqueous suspension with bromine at a temperature below 65° C. and isolating the product which precipitates as a solid.

The reaction takes a particularly favourable course if care is taken that the pH of the reaction mixture does not fall below 2 during the reaction. The pH is appropriately kept between 2.0 and 3.5, preferably between 2.5 and 3.0, which is best done by adding an aqueous caustic alkali solution, such as sodium hydroxide solution or potassium hydroxide solution. The preferred temperature range for the reaction is 40° to 45° C.

The following examples illustrate the process according to the invention:

EXAMPLE 1

435 g. of 3-amino-1,2,5-thiadiazole-(4)-carboxylic acid (3 mols) in 1470 ml. of water are briefly heated to 80° C. with 120 g. of sodium hydroxide, cooled to 40° C. and treated dropwise with 576 g. of bromine (3.6 mols) at this temperature, whilst stirring. When the pH of the suspension has dropped to 2.5 a pH of between 2.5 and 3 is established with 440 ml. of 4 N aqueous sodium hydroxide solution. After completion of the addition of bromine the mixture is stirred for a further hour at 40° C. cooled to 10° C., and the product filtered off and washed with water. Crude 3-amino-4-bromo-1,2,5-thiadiazole is thus obtained. Yield: 430.5 g.

The product is suspended in an eight-fold quantity of water, mixed with 80 ml. of 4 N sodium hydroxide and stirred for four hours. The residue is filtered off, washed with water and dried. Yield: 374.0 g. of 3-amino-4-bromo-1,2,5-thiadiazole, representing 69.2% of theory.

EXAMPLE 2

176 g. of 3-amino-1,2,5-thiadiazole-(4)-carboxylic acid sodium salt containing half a mol of water of crystallisation (1 mol) are suspended in 500 ml. of water and warmed for 15 minutes at 90° C. The mixture is then cooled to 40° C. and 151.8 g. of bromine (1.2 mols) are added dropwise over the course of one and a half hours whilst stirring and cooling. The pH of the suspension is initially 10 and rapidly declined. When the pH has reached 2.5, it is kept at between 2.5 and 2.7 by adding about 30 g. of sodium hydroxide as a 20% strength aqueous solution. After completion of the addition of bromine the mixture is stirred for a further hour at 40° C., cooled to 10° C. and the product filtered off. The crude product is suspended in an eight-fold amount of water, mixed with sufficient 20% strength sodium hydroxide to give a constant pH of 11.5, and stirred for 3 hours. The residue is filtered off, washed with water and dried.

Yield of 3-amino-4-bomo-1,2,5-thiadiazole: 127.1 g., representing 70.6% of theory. Melting point: 123° to 125° C.

EXAMPLE 3

58.0 g. of 3-amino-1,2,5-thiadiazole-(4)-carboxylic acid (0.4 mol) in 200 ml. of water are briefly heated to 90° C. with 26.4 g. of potassium hydroxide (85% strength), cooled to 40° C., and treated dropwise over the course of one and three-quarter hours with 80.0 g. of bromine (0.5 mol). At the same time 98 g. of 20% strength potassium hydroxide are added in such a way as to maintain a pH of 2.5. After completion of the addition of bromine the mixture is stirred for a further hour at 40° C., cooled to 10° C., and the product filtered off. The crude product is steam-distilled. Yield: After isolation, 43.2 g. of 3-amino-4-bromo-1,2,5-thiadiazole are obtained, corresponding to a yield of 60.0% of theory.

We claim:
1. A process for the preparation of 3-amino-4-bromo-1,2,5-thiadiazole which comprises reacting an alkali metal salt of 3-amino-1,2,5-thiadiazole-(4)-carboxylic acid in aqueous suspension with bromine at a temperature below btween 40 and 45° C. and at a pH of between 2 and 3.5, and isolating the product which precipitates as a solid.
2. A process according to claim 1, in which the pH of the reaction mixture is kept between 2 and 3.5 during the reaction by the addition of an aqueous caustic alkali solution.
3. A process according to claim 2 in which the pH of the reaction mixture is kept between 2.5 and 3.0.

References Cited

UNITED STATES PATENTS 3,247,193   4/1966   Menzl _____ 260—306.8 D
3,306,795   2/1967   Morse _____ 260—257

ALEX MAZEL, Primary Examiner

R. J. GALLAGHER, Assistant Examiner